(12) United States Patent
Cui et al.

(10) Patent No.: US 11,165,612 B2
(45) Date of Patent: Nov. 2, 2021

(54) DIRECT RADIATION WIRELESS DIGITAL COMMUNICATIONS SYSTEM AND METHOD BASED ON DIGITAL CODING METAMATERIAL

(71) Applicant: SOUTHEAST UNIVERSITY, Nanjing (CN)

(72) Inventors: Tiejun Cui, Nanjing (CN); Shuo Liu, Nanjing (CN); Guodong Bai, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 0 days.

(21) Appl. No.: 16/650,398

(22) PCT Filed: Aug. 24, 2018

(86) PCT No.: PCT/CN2018/102228
§ 371 (c)(1),
(2) Date: Mar. 25, 2020

(87) PCT Pub. No.: WO2019/200803
PCT Pub. Date: Oct. 24, 2019

(65) Prior Publication Data
US 2021/0006441 A1    Jan. 7, 2021

(30) Foreign Application Priority Data

Apr. 17, 2018   (CN) .......................... 201810341098.5
Jun. 21, 2018   (CN) .......................... 201810642069.2

(51) Int. Cl.
*H04L 25/49*    (2006.01)
*H01Q 3/44*    (2006.01)
(Continued)

(52) U.S. Cl.
CPC .......... *H04L 25/4906* (2013.01); *H01Q 3/44* (2013.01); *H01Q 19/10* (2013.01);
(Continued)

(58) Field of Classification Search
CPC .................................................. H04L 25/4906
(Continued)

(56) References Cited

U.S. PATENT DOCUMENTS 4,952,941 A * 8/1990 Landt ...................... H03B 9/12
342/202
5,608,722 A * 3/1997 Miller .................. H04B 7/0845
370/320

(Continued)

FOREIGN PATENT DOCUMENTS

| CN | 104078771 A | 10/2014 |
| CN | 106486784 A | 3/2017 |
| CN | 206271891 U | 6/2017 |

*Primary Examiner* — Lihong Yu
(74) *Attorney, Agent, or Firm* — Bayramoglu Law Offices LLC

(57) ABSTRACT

A direct radiation wireless digital communication system based on a digital programmable metamaterial, including a transmitting system and a receiving system, where information transmitted by the transmitting system is loaded to a programmable metamaterial, and is directly radiated into free space in a form of an ever-changing far-field pattern under the illumination of a feeding antenna; the receiving system collects electric field values received by receiving antennas located at different positions of a far-field region to obtain a far-field pattern, and recovers the transmitted original information according to a mapping relationship between the far-field pattern and a coding sequence. The system does not require a digital-to-analog conversion module and a frequency mixing module. The system also features an inherent secrete communication in the physical level which protects the transmitted information from being (Continued)

intercepted at a single point or any random points, and has the capabilities of self-adaption and self-perception.

10 Claims, 8 Drawing Sheets

(51) Int. Cl.
*H01Q 19/10* (2006.01)
*H04B 7/185* (2006.01)
*H04L 1/00* (2006.01)
*H04L 25/02* (2006.01)

(52) U.S. Cl.
CPC ..... *H04B 7/18513* (2013.01); *H04B 7/18515* (2013.01); *H04L 1/0009* (2013.01); *H04L 25/0242* (2013.01)

(58) Field of Classification Search
USPC ........................................................ 375/285
See application file for complete search history.

(56) References Cited

U.S. PATENT DOCUMENTS

| | | | |
|---|---|---|---|
| 2011/0121258 A1* | 5/2011 | Hanein | H02J 50/005 257/9 |
| 2015/0229372 A1* | 8/2015 | Perlman | H04L 25/03904 375/267 |
| 2017/0069966 A1 | 3/2017 | Black et al. | |
| 2018/0316090 A1* | 11/2018 | Foo | H01Q 3/44 |
| 2019/0089055 A1* | 3/2019 | Arnitz | H01Q 3/446 |
| 2019/0104421 A1* | 4/2019 | Urzhumov | H04W 16/28 |

* cited by examiner

DIRECT RADIATION WIRELESS DIGITAL COMMUNICATIONS SYSTEM AND METHOD BASED ON DIGITAL CODING METAMATERIAL

CROSS REFERENCES TO THE RELATED APPLICATIONS

This application is the national phase of International Application No. PCT/CN2018/102228, filed on Aug. 24, 2018, which is based upon and claims priority to Chinese Patent Application No. 201810642069.2 (CN), filed on Jun. 21, 2018, and Chinese Patent Application No. 201810341098.5, filed on Apr. 17, 2018, the entire contents of which are incorporated herein by reference.

TECHNICAL FIELD

The invention belongs to the technical field of wireless communication, and relates to a wireless digital communication system, and in particular to a direct radiation wireless digital communication system working on a microwave frequency band and based on a digital programmable metamaterial.

BACKGROUND

Along with inventions of telegram and telephone and finding of electromagnetic wave, fundamental revolution occurs to the communication manner of the mankind, and people perform wired information transmission by utilizing electric pulse on a metal wire and perform wireless communication by electromagnetic wave. The rapid development of the communication field in modern time benefits from the occurrence of a digital communication system, and the working principle of the modern digital communication system is roughly as follows: firstly converting to-be-transmitted information into a digital form (a binary code), thereby being convenient for electronic equipment such as a computer to perform storage and post processing. Researchers devoting to digital communication pay much attention to how to effectively code and modulate information all the time, so that the information arrives at a receiving terminal with a minimum bit error rate. A digital modulating module in the digital communication system realizes this function, and is the most important one in numerous functional modules of the modern digital communication system, and it will determine the transmission rate and the bit error rate of the whole system. Commonly used digital modulation methods in the modern digital communication system include amplitude shift keying (ASK), frequency shift keying (FSK) and phase shift keying (PSK), and in these modulation methods, signals are respectively loaded to the amplitude, frequency and phase of a reference carrier wave. In addition to this, there is another relatively complicated digital modulating method, i.e., quadrature amplitude modulation (QAM), it adopts two mutually orthogonal carrier wave signals, and therefore, a higher transmission rate and frequency utilization efficiency may be acquired in a limited physical bandwidth. Because the frequency of a digital signal in a binary form is too low, the digital signal cannot be directly radiated to a space, and therefore, there is a need for a digital-analog converter (DAC) which converts the digital signal to an analog signal first, then modulates the analog signal to a radio frequency signal (RF) in an analogous manner, then performs power amplification by a set of radio frequency amplifiers (PA), and finally radiates the signal to a free space by a transmitting antenna.

In the past 15 years, metamaterial takes equivalent media theory as basis, and controls the electromagnetic wave by regulating equivalent media parameters to trigger a series of peculiar physical phenomena, and thus may be referred to as "analog metamaterial/analog metamaterial". In 2014, Prof. Cui Tiejun provided a novel metamaterial, electromagnetically coding and programmable metamaterial, because the state (reflection/transmission phase) of units thereof is represented by a finite number of binary numerical values, it is also referred to as digital metamaterial/digital metamaterial. The first coding metamaterial is designed at the microwave band, has 1-bit code, that is, binary states "0" and "1" are adopted to respectively represent two units with reflection phases being 0 degree and 180 degree, and by arranging two units on a two-dimensional plane according to a predesigned sequence, a digital metamaterial with a certain regulating function to electromagnetic wave is formed. For example, when the given coding sequence is "0101 . . . " in periodical layout, normal incident electromagnetic wave is divided into two wave beams with same elevation angles; while when the codes are changed to checkerboard distribution, four wave beams with same elevation angles may occur in the radiation pattern. By quartering a 360-degree phase, a 2-bit coding metamaterial may be formed, and by changing the coding sequence, other functions such as single beam, multiple beams generation and random diffusion reflection may be achieved. The provision of the coding metamaterial provides convenience for realizing a programmable metamaterial with a dynamically adjustable directional diagram, by designing a unit structure loading switching diodes, electric regulation on digital states of "0" and "1" are achieved by conducting and turning off the diodes, so as to perform independent regulation on each unit structure in a field programmable gate array (FPGA) hardware system; and by offering different coding sequences to the programmable metamaterial, dynamic real-time function regulation may be achieved for the electromagnetic wave.

The above-mentioned coding metamaterial organically combines digital information with physical information successfully; however, a wireless communication system established by using a digital coding metamaterial is absent at present.

Moreover, noise exists everywhere, how to resist against noise is a key technology in the wireless communication system, and will determine the channel quality and transmission rate of the system; in the research progress of a conventional wireless digital communication system, a variety of different technologies and means have emerged to overcome or reduce the influence of noise to the communication systems, a relatively effective way to improve channel is to increase the signal to noise ratio (SNR) of the system, and it may be achieved by promoting the output power of a transmitter or adopting a multiple-input-multiple-output technology (MIMO), however, the two schemes are achieved at the cost of extra power consumption requirement and higher system complexity, and are infeasible to equipment sensitive to power consumption, such as satellite. A channel optimization method targeted to the wireless communication system based on metamaterial in a noise environment has not yet appeared in the prior art.

SUMMARY

To solve the above-mentioned problem, the present invention discloses a direct radiation wireless digital communication system working on a microwave frequency band and based on a digital programmable metamaterial, which, being quite different from a conventional communication system, has selfdistinct characteristics. Information to be transmitted is firstly loaded to a programmable metamaterial, then directly radiated to a free space under the illumination of a feeding antenna, and is finally received and collected by multiple receivers in a far-field region. The system does not contain the processes of digital-to-analog conversion and modulation required by the conventional wireless digital communication system, and has natural data transmission confidentiality at a physical level.

To achieve the purpose, the present invention provides the following technical scheme:

A direct radiation wireless digital communication system based on a digital coding metamaterial is provided, where a transmitting system includes a control module, a programmable metamaterial array and a feeding antenna. The control module is connected to a programmable metamaterial control line, and is used for converting information to be transmitted into a binary code, and loading them to a control line of the programmable metamaterial through a field programmable gate array (FPGA); the programmable metamaterial array includes an array of programmable metamaterial units, and is used to radiate the binary code into free space under the illumination of the feeding antenna in a form of an dynamically changing far-field radiation patterns; a receiving system includes a receiving processing module and multiple receiving antennas in signal connection with the receiving processing module, and is used for collecting electric field values received by receiving antennas located at different positions in a far-field region to obtain a far-field pattern, and recovering the original information according to a mapping relationship between the far-field pattern and a coding sequence. The control module converts the transmitted information to the binary code by utilizing a field programmable gate array (FPGA), and loads to a control line corresponding to the programmable metamaterial in a manner of high and low levels.

Further, the control module is capable of regulating the state of a diode in a programmable metamaterial unit by outputting level, and further dynamically controlling a reflection/transmission phase of each unit in a programmable metamaterial array.

Further, the programmable metamaterial unit structure includes an upper-layer metal structure, an F4B dielectric layer and a metal back plate from top to bottom. The upper-layer metal structure includes an H-shaped metal pattern, in which a diode is located in the H-shaped metal pattern and is electrically connected with the H-shaped metal pattern.

Further, a switching diode with an on-off state or a biased diode with continuous parameter change is adopted as the diode.

Further, the receiver includes rectifying antennas distributed at different angles, and the receiving processing module includes an AD analog-digital conversion module and field-programmable gate array (FPGA) processing system. The receiving rectifying antenna is used for receiving the electric field value intensity of their locations, and rectifying the AC signal into a DC signal; then the DC signal is input to the receiving processing module, which converts the analog signal into a digital signal through AD conversion, and the final discrete far-field pattern data is obtained by performing data processing in the field programmable logic array (FPGA) of the receiving system.

A direct radiation wireless digital communication method based on a digital coding metamaterial includes the following steps:
transmitting a binary code carrying original information to the far-field region in a form of a dynamically changing far-field pattern; and
collecting electric field values received by receiving antennas located at different positions of the far-field region to obtain a far-field pattern, and recovering the transmitted original information according to a mapping relationship between the far-field pattern and the coding sequence.

Further, before transmitting the binary code, the method further includes:
converting to-be-transmitted information into a binary code, and loading it to the corresponding control line of the programmable metamaterial.

Further, the method also includes a communication evaluation process, and the communication evaluation process includes:
firstly coding all possible states of a programmable metasurface with N control columns; then sampling far-field patterns corresponding to $2^N$ different codes at M different angles, and storing obtained data in a matrix A with $2^N$ rows and M columns; and then calculating Euclidean distance D between row vectors of the matrix A, then making a matrix D into a lower triangular matrix, setting all elements lower than a noise threshold to 0, and setting other elements to 1, to form a new matrix D', finally searching the numbers of rows not containing the 0 element in D', and outputting to a matrix K, so as to obtain the final code of the available states.

Further, after the communication evaluation process, the method also includes a communication optimization process, and the communication optimization process includes:
firstly solving the Euclidean distance of matrix data of far-field patterns collected at different angles, to obtain an Euclidean distance matrix D, outputting rows and columns, in which all elements greater than 0 are located, in the matrix D to i and j, storing all rows containing non-zero elements in the matrix D to a corresponding matrix b, then judging whether b belongs to an available state K, if so, continuing to search in the next row, and if not, adding b to the available state K, until a K matrix obtained after circulation is ended includes all available states optimized by a channel optimization algorithm.

A direct radiation wireless digital communication estimation method based on a digital coding metamaterial is provided, which is realized by a direct radiation wireless digital communication system based on a digital coding metamaterial, and includes the following steps:
firstly, coding all possible states of a programmable metasurface with N control columns; then sampling far-field patterns corresponding to $2^N$ different codes at M different angles, and storing obtained data in a matrix A with $2^N$ rows and M columns; and then calculating Euclidean distance D between row vectors of the matrix A, then making a matrix D into a lower triangular matrix, setting all elements lower than a noise threshold to 0, and setting other elements to 1, to form a new matrix D', finally searching the numbers of rows not containing the 0 element in D', and outputting to a matrix K, so as to obtain the final code of the available states.

A direct radiation wireless digital communication optimization method based on a digital coding metamaterial is provided, which is realized by a direct radiation wireless digital communication system based on a digital coding metamaterial, and includes the following steps:
firstly solving the Euclidean distance of matrix data of far-field patterns collected at different angles, to obtain an Euclidean distance matrix D, outputting rows and columns, in which all elements greater than 0 are located, in the matrix D to i and j, storing all rows containing non-zero elements in the matrix D to a corresponding matrix b, then judging whether b belongs to an available state K, if so, continuing to search in the next row, and if not, adding b to the available state K, until a K matrix obtained after circulation is ended includes all available states optimized by a channel optimization algorithm.

Compared with the prior art, the present invention has the following advantages and beneficial effects:

1. Compared with a conventional communication system, the communication system provided by the invention does not require digital-to-analog conversion module and frequency mixing module, greatly simplifies the complexity of the communication system, and reduces the cost of the communication system.

2. The communication system provided by the present invention has inherent confidentiality in the physical level, and is capable of ensuring that the transmitted information cannot be intercepted from a single point or any random points from the physical level. The receiving terminal can only successfully recovers the original information by receiving a signal of the far-field pattern at a required receiving point, while if the far field information of a certain point is lost, the original information cannot be recovered. An information stealing person can effectively intercept the information only by knowing each receiving position and knowing which receiving points are being used for transmitting information in real time.

3. The direct radiation wireless digital communication system provided by the present invention can effectively improve the transmission capacity of the system by increasing the controllable column number of the programmable metamaterial, and is more simple and convenient in the aspect of performance improvement than a conventional communication system.

4. Based on channel evaluation and channel optimization algorithms, the system of the invention has capabilities of self-adaption, self-perception and the like, when the system is in a condition of external interference, an error code occurs to original information transmission, and in such a condition, the communication evaluation and communication optimization programs are operated again, and the available state is acquired again, so as to ensure smooth communication. Compared with conventional communications systems, great promotion is achieved, and good foundation is laid for a communication system with a self-learning function.

DETAILED DESCRIPTION OF THE EMBODIMENTS

Detailed description will be made to the technical solution provided by the present invention in combination with specific embodiments, and it should be understood that the following specific implementation is only used for describing the present invention instead of limiting the scope of the present invention. Connection referred in the present invention includes all wired and wireless connection manners existing in the prior art, such as mechanical connection, electric connection and signal connection.

Figure 1:
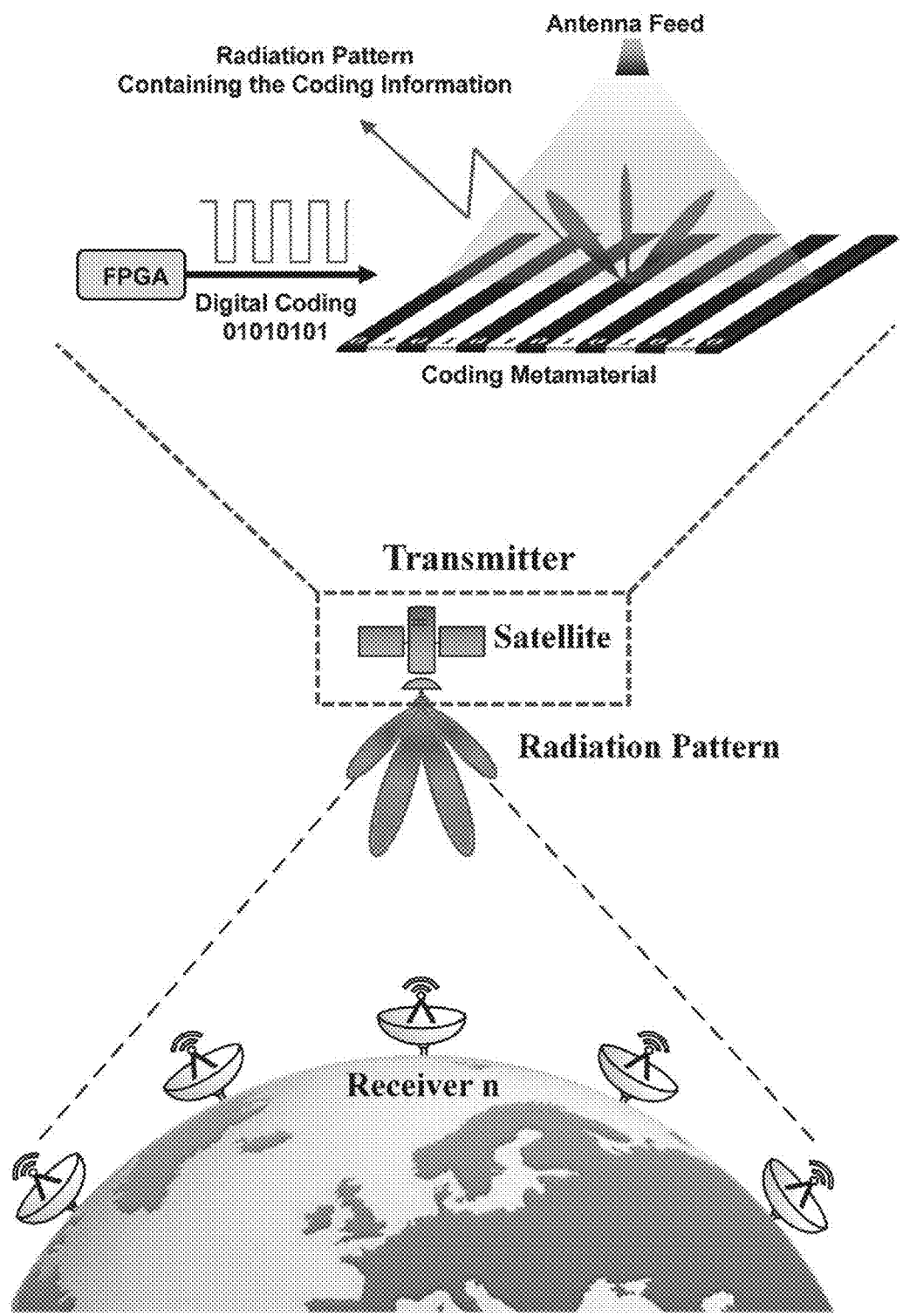
FIG. 1 is a structural chart of a direct radiation wireless communication system based on a digital coding metamaterial provided by the present invention, and a principle schematic diagram based on satellite-ground communication application of the system, where the structure and connection of a transmitting terminal of the system are shown.

A direct radiation wireless digital communication system based on a digital coding metamaterial, provided by the present invention, is formed by a transmitting system and a receiving system, FIG. 1 shows an application scene of the wireless communication system, a satellite-ground communication system, where a satellite may be taken as a transmitting terminal, and multiple receiving devices may be arranged on the ground. The transmitting system includes a transmitter, the transmitter is mainly formed by a field programmable gate array module (FPGA), a programmable metamaterial array and a feeding antenna, and the FPGA may be replaced with other control modules with a programming capability. The receiving system includes multiple rectifying antennas and a receiving processing module connected with the rectifying antennas, the rectifying antennas return received electromagnetic signals to electric signals, and then perform analog-digital conversion, so as to be convenient for subsequent FPGA processing in the rear receiving processing module. To-be-transmitted information is firstly converted to a binary code "00101001 . . . " by the FPGA, and then is loaded to a corresponding control line of the programmable metamaterial in the manner of voltage, to be used for controlling the "on" and "off" states of a switching diode in each control column, and further dynamically regulating the reflection/transmission phase of each unit in the programmable metamaterial array; under the illuminating of the feeding antenna, the binary code carrying original information is transmitted to a free space in a form of an ever-changing far-field pattern, the rectifying antennas located at different positions of a far-field region transmit respectively received electric field value intensity to the receiving processing module, then the receiving processing module collects data of the multiple rectifying antennas to obtain discrete far-field pattern data, and finally, the transmitted original information is recovered according to a mapping relationship between the far-field pattern and a coding sequence of the programmable metamaterial.

Figure 2:
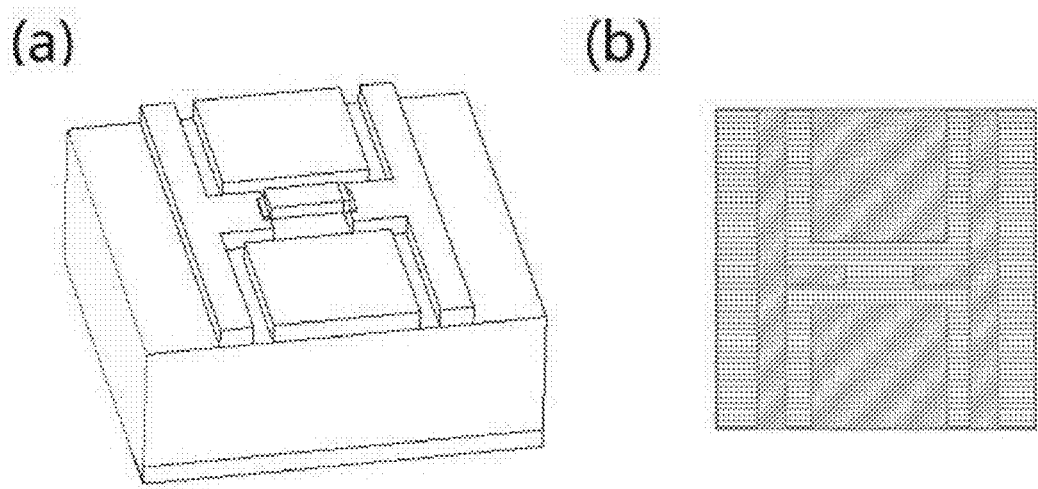
FIG. 2 is a schematic diagram of unit structure forming a programmable metamaterial in a transmitter of the present invention, where (a) is a space diagram, and (b) is a top view.
Figure 3:
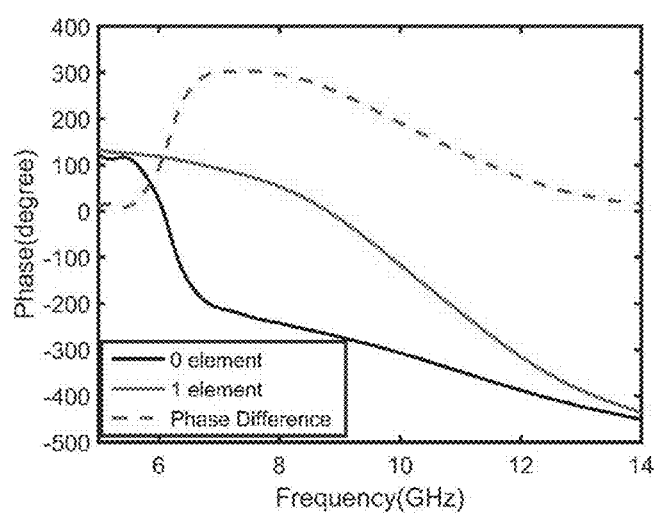
FIG. 3 shows reflection phase and phase difference corresponding to a switching diode in on and off states.

FIG. 2 shows unit structures forming the programmable metamaterial in the transmitter, where the unit structure is mainly formed by three parts, i.e., an upper-layer metal structure, an F4B dielectric layer and a metal back plate from top to bottom; the upper-layer metal structure is of an H-shaped metal pattern; the thickness of the dielectric layer is 3 mm, the dielectric constant is 2.65, and loss tangent is 0.001; a switching diode is welded on a surface of the H pattern, two sides of the H pattern extend to be connected with a feeding source line, and the whole pattern is used for adjusting phase in a synergistic manner. In the on/off state of the diode, the coding metamaterial unit has phase difference of 180 degrees in phase response of 10.15 GHz when the diode is in the "on" and "off" states under the illumination of normal incident electromagnetic wave, respectively corresponding to digital states of "0" and "1", as shown in FIG. 3. Based on the switching diode, at the moment, each unit has two different reflection/transmission phases, corresponding to the 1-bit programmable metamaterial; a biased diode with continuous parameter change may be also adopted, at the moment, each unit has multiple different reflection/transmission phases, corresponding to n-bit ($n \geq 2$).

Figure 4:
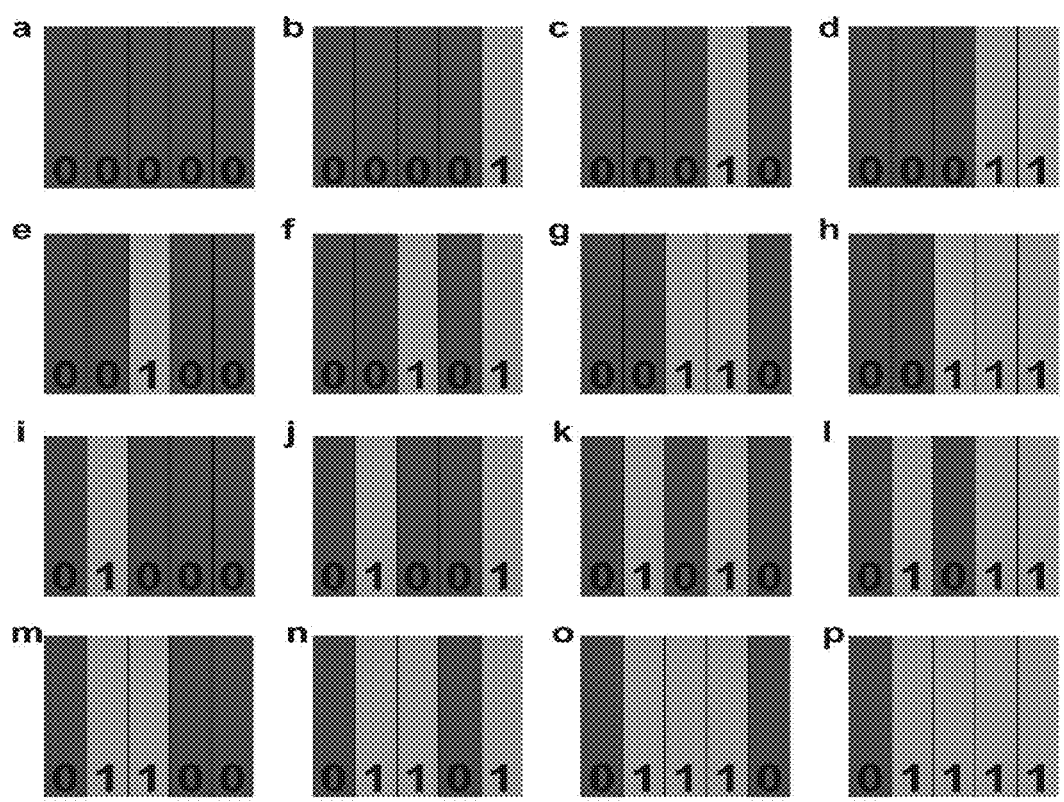
FIG. 4 is a code pattern corresponding to first 16 coding sequences of a field programmable metamaterial with 5 control columns.

To describe the working principle of the direct radiation wireless digital communication system provided by the invention, a 1-bit field programmable metamaterial with 5 control columns is shown here, the first column of code is fixed as 0, the other four columns of codes may be 0 or 1 randomly, and FIG. 4 shows all possible code patterns. Based on an FFT fast algorithm, a far-field pattern with a code pattern in a plane may be obtained, as shown in FIG. 5.

Figure 6:
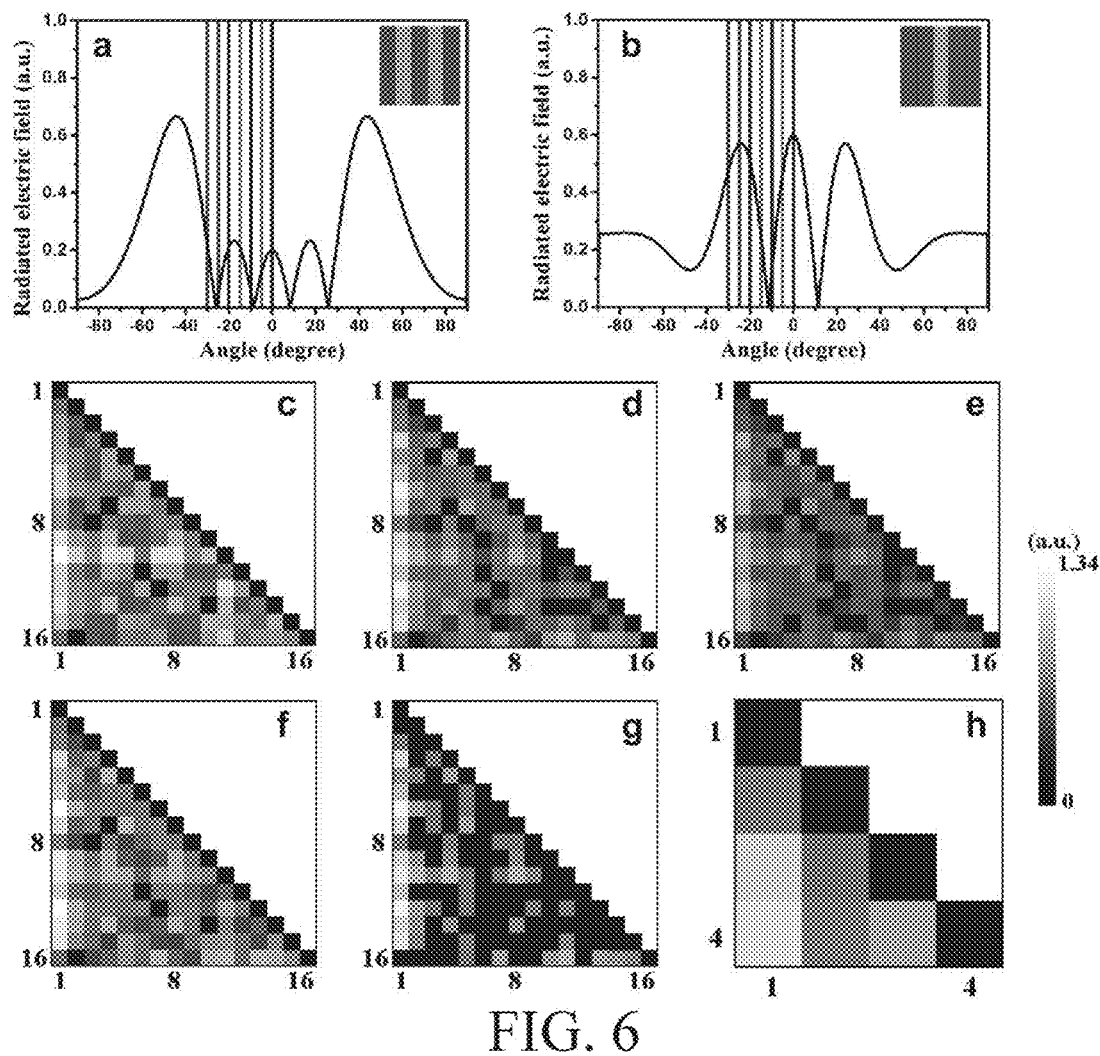
FIG. 6 is an explanatory drawing of performances of a channel evaluation algorithm and a channel optimization algorithm in the direct radiation wireless digital communication system.

FIGS. 6(a) and (b) respectively show the far-field patterns with codes of "01010" and "00100". It may be seen that significant difference exists between the two, which lays foundation for us to distinguish coding sequences corresponding to the two far-field patterns.

Figure 9:
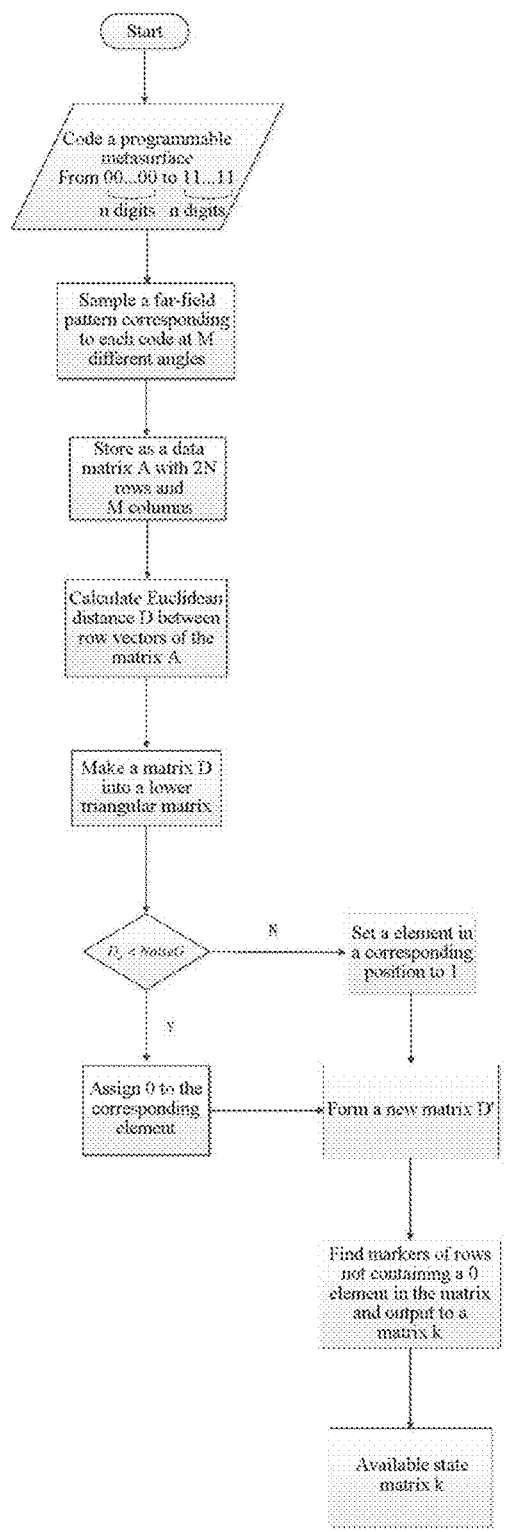
FIG. 9 is a flow diagram of a channel evaluation method.

The present invention also provides a channel evaluation method, which is used for calculating the state of available codes in the condition of any given control column N and background noise. FIG. 9 is a flow diagram of the channel evaluation method, and a working principle is briefly introduced as follows: firstly, coding all possible states of a programmable metasurface with N control columns; then sampling far-field patterns corresponding to $2^N$ different codes at M different angles, and storing obtained data in a matrix A with $2^N$ rows and M columns; and then calculating Euclidean distance D between row vectors of the matrix A, then making a matrix D into a lower triangular matrix, setting all elements lower than a noise threshold (Noise G) to 0, and setting other elements to 1, to form a new matrix D', finally searching the numbers of rows not containing the 0 element in D', and outputting to a matrix K, the matrix K being the final code of available states. The channel evaluation method is preferably pre-written in a control module.

Figure 5:
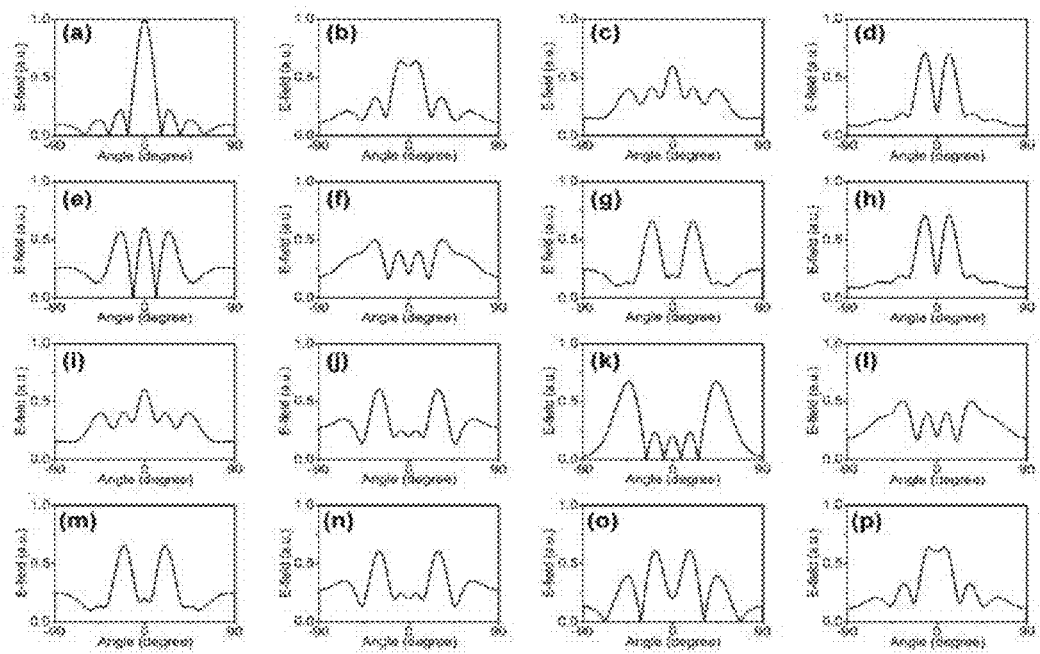
FIG. 5 is a far-field pattern of the first 16 coding sequences of a field programmable metamaterial with 5 control columns in a plane.

To quantitatively calculate the difference between all far-field patterns in FIG. 5, the Euclidean distances between two far-field patterns are respectively calculated, and are drawn in FIG. 6(c), where a gray value of each pixel (m, n) represents relative Euclidean distance between the m-th and the n-th far-field patterns, 6 black pixels located at (16,2), (9,3), (8,4), (12,6), (13,7), (14,10) represent that the distance therebetween is 0, meaning that every two of the 6 groups of far-field patterns are completely identical, and cannot be distinguished. For the present embodiment, 10 code states are available for unambiguous information transmission, which are respectively the (1,2,3,4,5,6,7,10,11,15)th coding sequences in FIG. 5, and information transmission may be performed at the rate of 3 bit/code element by randomly selecting 8 therefrom.

In practical application, there is no need to, and meanwhile, no way to completely acquire, for example, the whole far-field pattern between −90° and 90° in FIGS. 6(a) and (b). In satellite-earth communication application, the maximal angle (an included angle with a normal of the metamaterial) of the received far-field pattern depends on the height of the satellite away from the ground, although the angle may reach 80 degrees for close-orbit satellites, a signal received in a large angle exceeding 60 degrees has serious signal delay and attenuation than a signal at a small angle, and these factors will reduce the system transmission rate. In consideration of this, discrete sampling is only performed on the far-field patterns between 0 and 30 degrees, as shown by angles corresponding to straight lines of different colors in FIGS. 6(a) and (b). FIG. 6(d) shows an Euclidean distance matrix when the sampling point is located at 0°, 5°, 10°, 15°, 20°, and because the far-field pattern of the 1-bit programmable metamaterial is symmetric about the normal, only the far-field pattern at one side of the normal is sampled. Considering the receiving sensitivity of a ground station and unavoidable background noise interference in practical application, a distance pixel point with distance smaller than a certain noise threshold (it is set to 0.3 here) in the distance matrix is regarded as zero distance (marked by a black pixel point in the drawing). It may be seen from FIG. 6(d) that, the number of the available code state is reduced to 6, which are respectively 1, 2, 3, 4, 6, 7, and the transmission rate of 2 bit/code element may be supported by randomly selecting 4 states therefrom. If the sampling points are further reduced and sampling is only performed at 0°, 10°, 20°, it may be foreseen that, the average distance in the distance matrix will be further reduced, which may be seen from FIG. 6(e), the overall gray value of the matrix is remarkably lower than that in FIGS. 6(c) and (d); however, the number of available code states at the moment is still 6, indicating that reduction of the sampling point may not necessarily result in fewer available code states, but it may be confirmed that, the average distance of the whole Euclidean distance matrix may be effectively increased by increasing the sampling points or extending the sampling angle scope, so that the system has better anti-noise performance, which may be further verified in FIG. 6(f), at this time, the sampling angles are 0°, 5°, 10°, 15°, 20°, 25° and 30°, and the gray value of the distance matrix in FIG. 6(f) is obviously higher than that in FIGS. 6(d) and (e).

Considering possible exposure to high noise environment in practical application, the performance of the direct radiation wireless digital communication system in a relatively high noise threshold needs to be further considered, sampling points in FIG. 6(g) are the same as those in FIG. 6(d), but the noise threshold is increased to 0.6, it may be obviously seen that the original relatively dark pixel point (closer distance) in FIG. 6(d) turns black (zero distance) in FIG. 6(g), and it may be found, by adopting a channel evaluation algorithm, that the available state number at the moment is only 1, that is because too many zero elements exist in the matrix, and many states are interconnected together, resulting in that a system falls into a worst state and cannot transmit any information. Under this condition, there is a need of finding a channel code algorithm similar to that in digital communication, that is, increasing the available code state of the direct radiation wireless digital communication system under the condition of not increasing the signal to noise ratio of the system, so as to increase the transmission rate. The invention further provides a channel optimization algorithm, which increases the number of the available code state by abandoning some code states.

Figure 10:
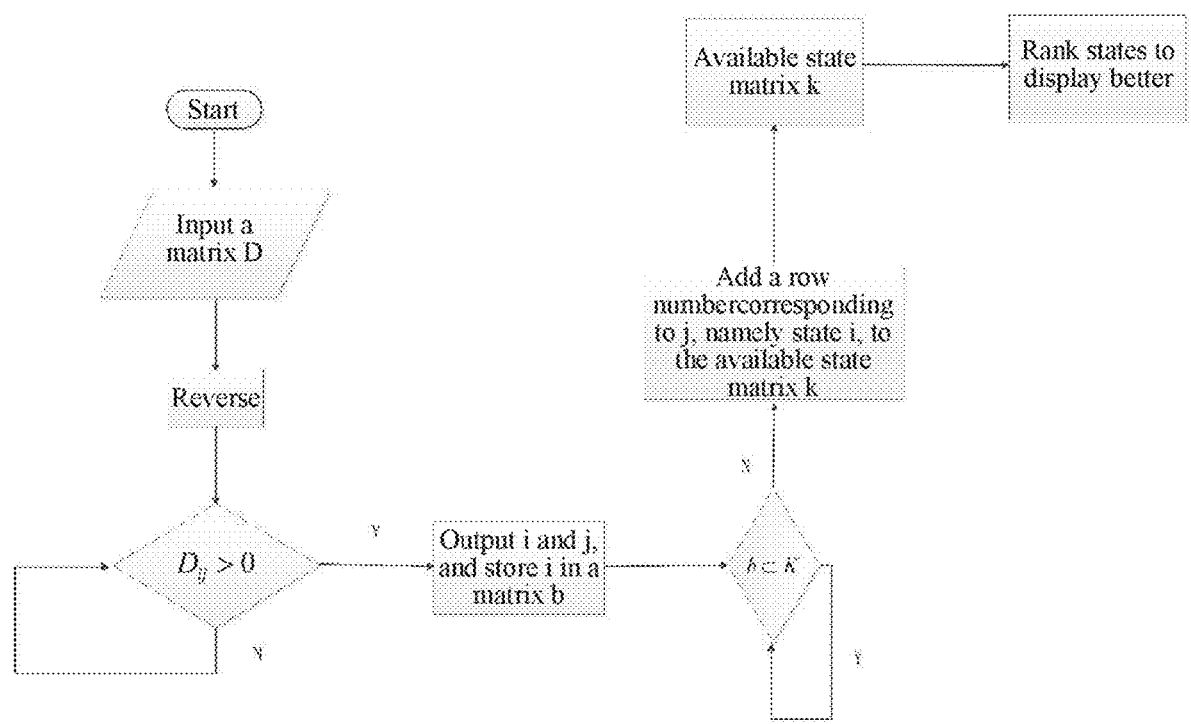
FIG. 10 is a flow diagram of a channel optimization method.

FIG. 10 is a flow diagram of the channel optimization algorithm, and a working principle thereof is briefly introduced as follows: firstly solving the Euclidean distance of matrix data of far-field patterns collected at different angles, to obtain an Euclidean distance matrix D, outputting rows and columns, in which all elements greater than 0 are located, in the matrix D to i and j, storing all rows containing non-zero elements in the matrix D to a corresponding matrix b, then judging whether b belongs to an available state K, if so, continuing to search in the next row, and if not, adding b to the available state K, where a K matrix includes all available states optimized by a channel optimization algorithm after circulation is ended.

Figure 8:
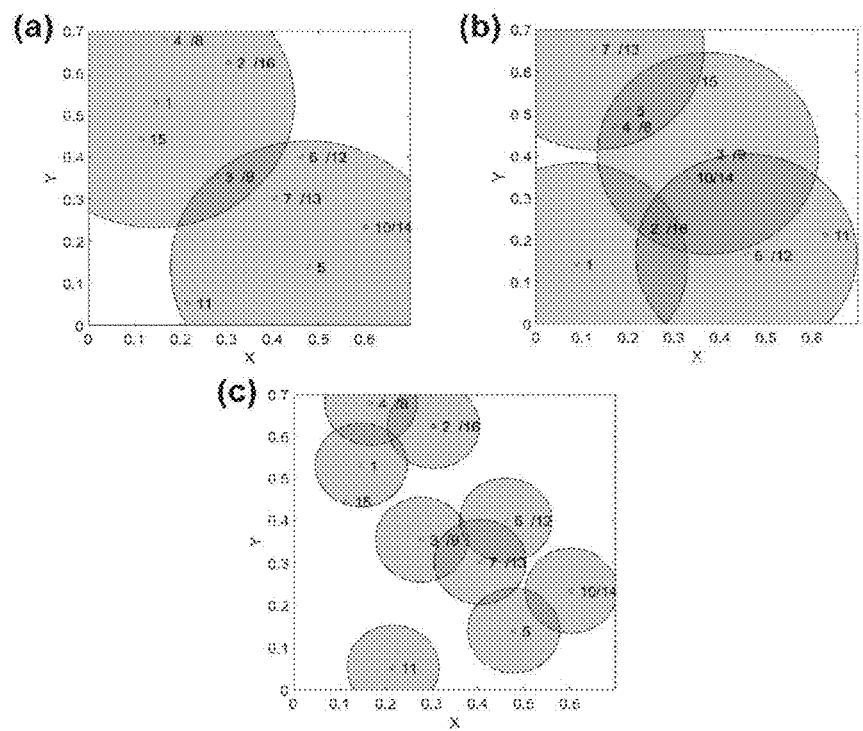
FIG. 8 is an example of the direct radiation wireless digital communication system adopting a field programmable metasurface with 5 control columns and 2 sampling angles, where a transverse coordinate and a vertical coordinate in the drawing respectively represent far-field electric field normalization values collected by two sampling angles; (a) the sampling angles are 10° and 30°, and the noise threshold is G=0.3; (b) the sampling angles are 20° and 40°, and the noise threshold is G=0.3; and (c) the sampling angles are 10° and 30°, and the noise threshold is G=0.1.

In the following, the working principle of the channel optimization algorithm will be illustrated by a two-dimensional condition (that is, only two sampling points exist). Here, the same field programmable metasurface with 5 control columns in FIG. 4 is still adopted, when only two sampling points are adopted, sampling data corresponding to each code may be simply shown in a two-dimensional rectangular coordinate system as shown in FIG. 8, and the Euclidean distance therebetween also may be intuitively read out from the drawing. FIG. 8(a) shows the positions of 16 code states in a two-dimensional coordinate system when the sampling points are located at 10° and 30°, and it is seen that the code states 16, 9, 8, 12, 13 and 14 respectively have the same coordinates as those of states 2, 3, 4, 6, 7 and 10. At the moment, if a noise threshold G is set for the system, any two code states with distance smaller than G cannot be distinguished and thus are regarded as one code state. Because the distances between all code states are all smaller than 0.3, when G=0.3, all the code states cannot be distinguished, and are regarded as one state, and at the moment, no information will be transmitted. If circles are drawn by taking states 1 and 5 as circle centers and 0.3 as radius in FIG. 8(a), it will be found that state 3/9 falls within the two circles at the same time, its existence results in that states 1 and 5 are connected together and cannot be distinguished, and therefore, it may be quite naturally thought that if the state 3/9 is deleted, connection of states 1 and 5 is broken, and then the two may be distinguished from each other, and the system is capable of transmitting in a rate of 1-bit/code element. By carefully observing FIG. 8(a), existence of other combinations may be found, to be used for supporting transmission of 1-bit/code element, such as 2/16 and 11, 4/8 and 10/14, 5 and 4/8 etc. However, with the noise threshold of G=0.3, no matter how to optimize, only two available code states may be acquired maximally, and an only method for continuously increasing the number of the available code states is to reduce the noise threshold, that is equivalent to increasing the signal to noise ratio of the system.

In a second embodiment, the sampling angles are changed to 20° and 40°, and the coordinate positions of the 16 code states are changed. As shown in FIG. 8(b), like the above-mentioned embodiment, when the noise threshold G is still 0.3, only one available code state exists. If channel optimization processing is performed on the Euclidean distance matrix, it may be found that if states 2, 4/8, 5 are deleted, 4 available code states may be obtained, which are respectively 1, 3/9, 6/12, 7/13. It may be seen from the embodiment that, changing the positions of the sampling points will be favorable for increasing the number of available code states after optimization. In a third embodiment as shown in FIG. 8(c), the noise threshold G is reduced to 0.1, and the sampling angle is kept consistent to that in the first embodiment. At the moment, 9 available code states exist, which are respectively 1, 2/16, 3/9, 4/8, 5, 6/12, 7/13, 10/14, 11. However, because the code states are independent from one another at the moment, the condition that a certain code state is simultaneously connected with another two code states does not exist, and then the channel optimization algorithm cannot increase any available state.

After knowing the working principle of the channel optimization algorithm, by performing channel optimization processing on the distance matrix in FIG. 6(g), 4 available code states are acquired, which are respectively 1, 3, 4, 11. At the moment, the transmission rate of 2-bit/code element the same as that in FIG. 6(d) may be still supported. FIG. 6(h) shows the Euclidean distance matrices of 4 code states at the moment, and it may be seen that all the matrices are obviously greater than zero. It is thus clear that, the channel optimization method is capable of effectively increasing the transmission rate of the direct radiation wireless digital communication system.

Figure 7:
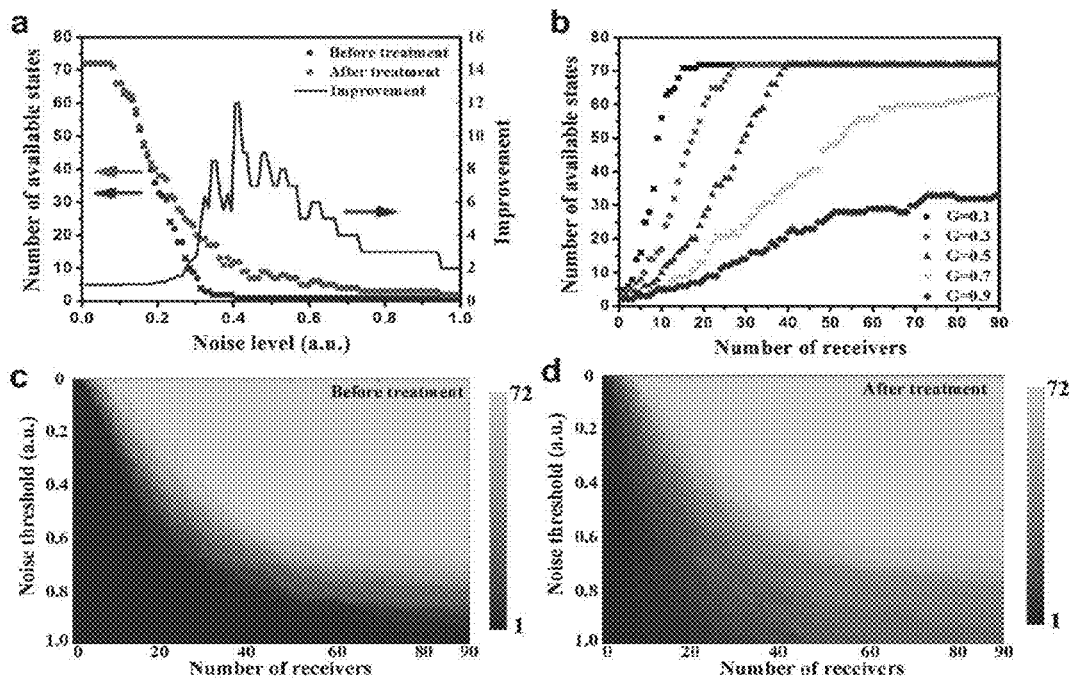
FIG. 7 shows quantitative analysis of influence of the channel optimization algorithm to a direct radiation wireless digital communication system with 9 control columns by giving different noise thresholds and sampling point numbers.

Because satellite-earth communication usually prefers to a high-bit-rate transmission rate, there is a need of further deep analysis on the channel optimization method. The increasing capability of the channel optimization algorithm to the number of the available code states is quantitatively inspected by setting different noise thresholds and sampling resolutions for the direct radiation wireless digital communication system based on 9 control columns. At the moment, the sampling angles are set at 0°, 5°, 10°, 15° and 20°. FIG. 7(a) shows the number of the available code states of the system before (square marks) and after (round marks) the adoption of the optimization method, where the horizontal axis is the noise threshold. It may be clearly seen that when the noise threshold is increased from 0.1 to 0.3, two curves both descend rapidly, illustrating that an obvious noise threshold exits both before and after processing with the optimization method, so that the number of the available code states of the system is reduced rapidly. However, after the channel optimization method is adopted, the number of the available states with noise in the interval of 0.3-0.67 is increased by at least 4 times. When the noise threshold is 0.41, the increase amplitude is maximum (the number of the available states is 12), while only one available state exists when the channel optimization method is not adopted, no data may be transmitted, and this increase amplitude is equivalent to increase of the transmission rate by 2-3 times. It may be found, by further observing the number of the code states after optimization, that in the noise threshold scope given in the drawing, the transmission rate of at least 1-bit/code element is supported, while the transmission rate of 2-3 bits/code element will be supported under the condition that the noise threshold is not very high (<0.72).

The above-mentioned examples show the important role of the channel optimization method in increasing the system transmission rate. Here, the influence of the number of sampling points to the system performance is analyzed by giving curves of available codes in case of different noise thresholds. As shown in FIG. 7(b), the abscissa represents the number of sampling points which are counted from 0° (the normal direction) and at an interval of 1°, for example, 30 represents that one receiver exists at an interval of 1° from 1° to 30°. All curves have already been processed by the channel optimization method. It may be seen from FIG. 7(b) that, all curves are increased along with increase of the number of the sampling points, when the noise threshold is set to 0.1, the number of the available code states is rapidly increased from 1 to 15, and when the number of the sampling points reaches 19, the system achieves the maximal number of the available state, 72, which means that when the number of the sampling points exceeds a certain key point, the number of the available states of the system reaches a saturation point and does not increase any more. When the system is in a low background noise environment, the optimal state may be achieved by only needing a few of sampling points. When the noise threshold is further increased to 0.3 and 0.5, the key point is increased to 28 and 40 respectively; however, when the noise threshold is further increased to 0.7 and 0.9, the number of the available states of the system is reduced sharply, and even if the number of the sampling points exceeds 90, the optimal state cannot be realized. However, in such a high background noise state, the number of the available states may be still effectively increased by adopting the channel optimization algorithm.

To evaluate the influences of both the noise threshold and the sampling number to system performance, the two-dimensional diagram of the number of the available code states in the noise threshold and the sampling number are given in FIGS. 7(c) and (d), where FIG. 7(c) is the one without adopting the channel optimization algorithm, and FIG. 7(d) is the one after being processed with the channel optimization algorithm. At the moment, the number of the control columns of the system is still 9 columns. Obviously, when the number of the sampling points is increased, the number of the available codes is increased in both of the two conditions, the lower the noise threshold is, the smaller the number of the sampling points needed for reaching the optimal state is. As for the condition without adoption of the optimization algorithm, when the number of the sampling points is smaller than 20, the number of the available code states is very limited (as shown in a purple part in FIG. 7(c), and the change from the optimal state to the worst state is very rapid, resulting in an obvious boundary. After the channel optimization method is adopted, the number of the available code states is obviously increased, the original purple part in FIG. 7(c) turns black in FIG. 7(d), indicating that the channel optimization method may retard the change scope of the system from the optimal state to the worst state, so as to reduce the sensibility of the system to noise and the number of the sampling points.

By integrating the channel evaluation method and the channel optimization method to an FPGA control system, rapid response will be made quickly in various environments or in a condition of suffering from external disturbance, so as to detect the available code states, and effectively guarantee the communication rate and communication quality.

Because the direct radiation wireless digital communication system similarly adopts multiple receivers, researchers may tend to assort the direct radiation wireless digital communication system and an MIMO system to the same class, and it needs to be pointed out that the two systems belong to two kinds of entirely different wireless communication systems in nature. The MIMO system sufficiently utilizes the multipath effect of the electromagnetic wave by adopting multiple transmitters and multiple receivers, so as to improve the system capacity and reliability, while the direct radiation wireless digital communication system does not need to adopt multiple transmitters. The reason why the MIMO system needs to adopt multiple transmitters is that the MIMO system needs to transmit multiple pieces of information streams with a low bit rate by different antennas, so as to acquire the maximal space diversity gain, however, this manner still belongs to a modern digital communication system, and the information is still modulated on the carrier wave in the manners of amplitude, frequency or phase. Moreover, in the MIMO system, low correlation between signals may be met just by remaining the distance between the receivers at a half of or one wavelength. However, in the direct radiation wireless digital communication system, the receivers need to stretch across the whole far-field pattern, and the distance is far greater than the distance between the receivers in the MIMO system. One most important difference is that, for the direct radiation wireless digital communication system, information is modulated on the far-field pattern of a field programmable metasurface antenna, and a baseband digital signal may directly act on the field programmable metasurface antenna in the form of figures without modulation, and further is radiated to a free space under the illuminating of a feeding source, and therefore, compared with the modern digital communication system, the direct radiation wireless digital communication system is greatly simplified in system architecture. It needs to be pointed out that, although the satellite-earth communication is taken as an example herein to analyze and discuss the direct radiation wireless digital communication system, it does not mean that the system only works under such a line-of-sight propagation condition. In practical application, the possibility of change of the far-field pattern due to object shielding in the near-field region of the transmitter and the receivers, or signal attenuation caused by various factors in the propagation channel should be considered, but it does not affect the normal work of the direct radiation wireless digital communication system, and the system performance may be improved by utilizing the channel evaluation method and the channel optimization method. After establishment of the system is completed and before use, the optimal position, angle and parameter should be determined by channel evaluation and repeated adjustment of the receiving system. When the evaluation result does not meet the requirement, the available code states are increased by adopting the channel optimization method. Real-time evaluation and optimization may be also performed on the channel, and the available code states are updated in real time, so that the system is in the maximal transmission rate in real time. The brand new communication system provided by the present invention is a self-adaptive (having cognation and self-perception functions) system capable of handling different wireless communication conditions such as shielding and multipath.

Because the direct radiation wireless digital communication system works in a frequency domain, the needed bandwidth is very narrow, and it is believed that by developing a dual-band even multi-band field programmable metasurface, realization of information transmission at a higher rate is benefited. Another advantage of the direct radiation wireless digital communication system, in comparison with the modern digital communication system, is support to high order modulation, that is, the system is capable of realizing a higher transmission rate under the same code element rate (baud rate), so as to acquire a higher spectrum efficiency. For an application scene with a generally low signal to noise ratio, such as satellite-earth transmission. To control the bit error rate (BER) in a certain scope, a generally adopted highest modulation mode is QPSK, that is, 2 bit information is transmitted in one code element cycle. While for the direct radiation wireless digital communication system, the far-field pattern with higher resolution is acquired by increasing the number of the controllable column of the field programmable metasurface and meanwhile deploying denser ground stations on the earth; it is believed that high order modulation of 8-bits/code element may be easily achieved by engineering optimization, the transmission rate is higher than that of a QPSK modulation mode by at least 4 times, and if a dual-band field programmable metasurface is adopted on this basis, the transmission rate may be increased by 8 times, which will bring about the revolutionary breakthrough of the satellite-earth data transmission rate.

Another distinct characteristic of the direct radiation wireless digital communication system is the natural confidentiality, which ensures that the transmitted information cannot be intercepted from a single point or a non-key point at the bottommost physical level, and it is different from a conventional communication manner that information safety protection needs to be performed by a large amount of software encryption algorithms. That is because the transmitted information is scattered to different angles of the far-field pattern, a receiving terminal may recover all transmitted data only by simultaneously and completely acquiring data on appointed sampling points, while if the far field information of a certain point hereof is lacked, the original information cannot be recovered. However, as for the application scene such as satellite-earth transmission, because the distance between the sampling points is often hundreds of, even thousands of kilometers, and the span of the whole sampling points even exceeds tens of thousands of kilometers, an eavesdropper cannot technically acquire signals of these sampling points at the same time, even if the eavesdropper may acquire the whole far-field pattern, because the eavesdropper does not know the current channel state, that is, which of the sampling points are being used now, and the mapping relationship between the data (hardware code) of these sampling points and the original transmitted information (information code), the eavesdropper yet cannot recover the original transmitted information. It is similar to a frequency hopping technology (FH) in the modern digital communication system, that is, the transmitted signal hops to and fro among multiple different frequencies, while hopping frequency points determined by a pseudorandom sequence are only known by a transmitting side and a receiving side.

Different from the frequency hopping technology, a real-time channel evaluation manner adopted in the direct radiation wireless digital communication system does not consume additional bandwidth. Such a unique property means that the communication system is an inherent secure communication system; another advantage of the direct radiation wireless digital communication system is that the digital signal is directly coding to the programmable metamaterial, and is directly radiated to the free space by the programmable metamaterial, and thus saving the process of loading intermediate-frequency carrier wave in the conventional communication system, and greatly simplifying the complexity of the communication system. Secondly, algorithms for channel detection and channel optimization are written in the present invention, so that the provided system makes response rapidly in different environments or in a condition of being disturbed, and further the available code states are detected, and the communication rate and communication quality are effectively guaranteed.

It needs to be illustrated that only preferred implementations of the present invention are mentioned above, and the characteristic of being easy to realize and simulate is achieved because of the unique manner of directly representing information by utilizing the far-field pattern. It should be noted that a person of ordinary skill in the art may make some alternations and modifications without deviating from the principle of the present invention, and these alternations and modifications should be also regarded as the protection scope of the present invention.

What is claimed is:

1. A direct radiation wireless digital communication system employing a digital coding metamaterial, comprising: a transmitting system and a receiving system, wherein the transmitting system comprises a control module, a programmable metamaterial array and a feeding antenna;

the control module is connected to a programmable metamaterial control line, and converts information to be transmitted into a binary code, and loads the binary code to a control line of the programmable metamaterial array;

the programmable metamaterial array comprises an array of programmable metamaterial units, such that the programmable metamaterial array is driven digitally with binary code and a reflection/transmission phase of each unit in the programmable metamaterial array is dynamically controlled, wherein the binary code carrying the information is radiated into free space under the illumination of the feeding antenna in a form of a dynamically changing far-field radiation pattern under the illumination of the feeding antenna;

the receiving system comprises a receiving processing module and multiple receiving antennas in signal connection with the receiving processing module, where the receiving system collects electric field values received by receiving antennas located at different positions in a far-field region to obtain the far-field radiation pattern radiated from the programmable metamaterial array, and recovers the transmitted original information according to a mapping relationship between the far-field pattern and a coding sequence; and a processor configured to perform a communication evaluation process, the communication evaluation process comprising:

coding all possible states of a programmable metasurface with N control columns; sampling far-field patterns corresponding to $2^N$ different codes at M different angles, and storing obtained data in a matrix A having $2^N$ rows and M columns; and calculating Euclidean distance between row vectors of the matrix A and making a Euclidean distance matrix D comprising a lower triangular matrix, setting all elements lower than a noise threshold to 0, and setting other elements to 1, to form a matrix D', finally searching the number of rows not containing the 0 element in D', and outputting to a matrix K, so as to obtain final code of available states.

2. The direct radiation wireless digital communication system employing a digital coding metamaterial according to claim 1, wherein the programmable metamaterial unit comprises: an upper-layer metal structure, a middle F4B dielectric layer and a lower-layer metal back plate, the upper-layer metal structure comprises an H-shaped metal pattern, in which a diode is located in the H-shaped metal pattern, and the diode is electrically connected with the H-shaped metal pattern.

3. The direct radiation wireless digital communication system employing a digital coding metamaterial according to claim 2, wherein the diode comprises: at least one of a switching diode with an on-off state and a biased diode with continuous parameter change.

4. The direct radiation wireless digital communication system employing a digital coding metamaterial according to claim 1, wherein the receiving system comprises rectifying antennas distributed at different angles, and the receiving processing module comprises an AD (analog-digital) conversion and field-programmable gate array processing system.

5. A direct radiation wireless digital communication method for a direct radiation wireless digital communication system using the system of claim 1, comprising:
  the method comprising the steps of:
    generating the binary code by the control module;
  applying the binary code to the metamaterial array;
  programming the reflection/transmission phase of each unit in the programmable metamaterial array;
  transmitting the binary code carrying original information from a programmable_metamaterial array to the far-field region in a form of an ever-changing far-field pattern; and
  collecting electric field values received by receiving antennas located at different positions of the far-field region to obtain the far-field radiation pattern radiated from the_programmable metamaterial array; and
  recovering the transmitted original information according to a mapping relationship between the far-field pattern and a coding sequence.

6. The direct radiation wireless digital communication method employing a digital coding metamaterial according to claim 5, wherein the method further comprises: prior to transmitting the binary code, converting to-be-transmitted information into a binary code, and loading the binary code to a control line corresponding to the programmable metamaterial array.

7. The direct radiation wireless digital communication system according to claim 1, wherein the programmable metamaterial array is driven digitally with the binary code and the reflection/transmission phase of each unit in the programmable metamaterial array is programmed; wherein channel noise is detected and channel optimization is performed and the programmable metamaterial array is programmed based on the optimization result to increase a signal to noise ratio.

8. The direct radiation wireless digital communication method employing a digital coding metamaterial according to claim 5, wherein the method also comprises a post communication evaluation process communication optimization process comprising: outputting rows and columns, in which all elements greater than 0 are located, in the matrix D to i and j, storing all rows containing non-zero elements in the matrix D to a corresponding matrix b, wherein if states in row of matrix b belong to an available states of a programmable metasurface matrix K, continuing to search in the next row, and if states in row of matrix b does not belong to available states of the matrix K, adding states in row of matrix b to the available states of matrix K, until matrix K comprises all available states optimized by a channel optimization algorithm.

9. A direct radiation wireless digital communication estimation method employing a digital coding metamaterial comprising the following steps:
  coding all possible states of a programmable metasurface with N control columns;
  sampling far-field patterns corresponding to $2^N$ different codes at M different angles;
  storing obtained data in a matrix A with $2^N$ rows and M columns;
  calculating Euclidean distance between row vectors of the matrix A;
  making a Euclidean distance matrix D comprising a lower triangular matrix;
  setting all elements lower than a noise threshold to 0, and setting other elements to 1, to form a matrix D'; and
  searching the numbers of rows not containing the 0 element in D', and outputting to a matrix K, so as to obtain final code of the available states.

10. A direct radiation wireless digital communication optimization method employing a digital coding metamaterial comprising the following steps:
  coding all possible states of a programmable metasurface with N control columns;
  sampling far-field patterns corresponding to $2^N$ different codes at M different angles, and storing obtained data in a matrix A having $2^N$ rows and M columns; and
  calculating Euclidean distance between row vectors of the matrix A and making a Euclidean distance matrix D;
  outputting rows and columns, in which all elements greater than 0 are located, in the matrix D to i and j;
  storing all rows containing non-zero elements in the matrix D to a corresponding matrix b;
  if states in row of matrix_b belongs to an available states of a programmable metasurface matrix K, continuing to search in the next row, and if states in row of matrix b does not belong to available states of the matrix K, adding states in row of matrix_b to the available states of matrix K, until matrix K comprises all available states optimized by a channel optimization algorithm.

* * * * *